US009975512B2

(12) United States Patent
Nakashima et al.

(10) Patent No.: US 9,975,512 B2
(45) Date of Patent: May 22, 2018

(54) AIR BELT DEVICE

(71) Applicant: KABUSHIKI KAISHA TOKAI-RIKA-DENKI-SEISAKUSHO, Aichi (JP)

(72) Inventors: Ryu Nakashima, Aichi (JP); Masaru Ukita, Aichi (JP); Shinichi Okubo, Aichi (JP); Tomonari Umakoshi, Aichi (JP); Haruhiko Hashimoto, Aichi (JP); Tatsuhiro Murasaki, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days. days.

(21) Appl. No.: 15/319,340

(22) PCT Filed: Jun. 12, 2015

(86) PCT No.: PCT/JP2015/067069
§ 371 (c)(1),
(2) Date: Dec. 15, 2016

(87) PCT Pub. No.: WO2016/002483
PCT Pub. Date: Jan. 7, 2016

(65) Prior Publication Data
US 2017/0136975 A1    May 18, 2017

(30) Foreign Application Priority Data
Jul. 1, 2014   (JP) .................................. 2014-136118

(51) Int. Cl.
*B60R 21/18*    (2006.01)
*B60R 21/237*   (2006.01)
(Continued)

(52) U.S. Cl.
CPC ............ *B60R 21/18* (2013.01); *B60R 21/237* (2013.01); *B60R 22/12* (2013.01); *B60N 2/06* (2013.01);
(Continued)

(58) Field of Classification Search
CPC ............................... B60R 21/18; B60R 22/12
(Continued)

(56) References Cited

U.S. PATENT DOCUMENTS 5,282,648 A *  2/1994  Peterson ................. B60R 21/18
                                                    244/122 B
9,434,339 B2 * 9/2016  Witt ........................ B60R 21/18
(Continued)

FOREIGN PATENT DOCUMENTS

EP        1188623 A2 *  3/2002   ............. B60R 21/18
JP        2000-142303    5/2000
(Continued)

OTHER PUBLICATIONS

International Search Report and Written Opinion PCT/JP/2015/067069 dated Sep. 1, 2015.

*Primary Examiner* — Faye M Fleming
(74) *Attorney, Agent, or Firm* — Roberts Mlotkowski Safran Cole & Calderon P.C.

(57) ABSTRACT

An air belt device is provided with a webbing that is fitted around a vehicle occupant who is sitting in a vehicle seat, and an airbag portion that is provided in parallel with the webbing and is inflated and deployed when gas is supplied to an interior thereof. The airbag is provided with a reference portion that forms a portion of the airbag and is formed as a result of the airbag being folded. The airbag is also provided with a slack portion that forms another portion of the airbag and is formed as a result of the airbag being folded, and that extends in parallel with the reference portion
(Continued)

and whose dimension in the transverse direction of the webbing is set longer than a dimension in the transverse direction of the webbing of the reference portion.

6 Claims, 14 Drawing Sheets

(51) Int. Cl.
  *B60R 22/12* (2006.01)
  *B60R 21/235* (2006.01)
  *B60R 22/18* (2006.01)
  *B60R 22/26* (2006.01)
  *B60R 22/34* (2006.01)
  *B60N 2/22* (2006.01)
  *B60N 2/06* (2006.01)

(52) U.S. Cl.
  CPC ............... *B60N 2/22* (2013.01); *B60R 22/26* (2013.01); *B60R 22/34* (2013.01); *B60R 2021/23538* (2013.01); *B60R 2021/23576* (2013.01); *B60R 2022/1806* (2013.01)

(58) Field of Classification Search
  USPC ........................................ 280/733
  See application file for complete search history.

(56) References Cited

U.S. PATENT DOCUMENTS

| 9,561,771 | B2* | 2/2017 | Okubo | B60R 21/18 |
| 2002/0125700 | A1* | 9/2002 | Adkisson | B60R 21/18 |
| | | | | 280/733 |
| 2007/0001435 | A1* | 1/2007 | Gray | B60R 21/18 |
| | | | | 280/733 |
| 2012/0306185 | A1* | 12/2012 | Kim, II | B60R 21/18 |
| | | | | 280/733 |
| 2016/0250987 | A1* | 9/2016 | Okubo | B60R 21/18 |
| | | | | 280/729 |
| 2016/0297389 | A1* | 10/2016 | Umakoshi | B60R 21/18 |
| 2017/0190310 | A1* | 7/2017 | Okubo | B60R 21/18 |

FOREIGN PATENT DOCUMENTS

| JP | 2002-502918 | | 1/2002 | |
| JP | 2006-96168 | | 4/2006 | |
| JP | 2014-019294 | | 2/2014 | |
| JP | 2015107721 A | * | 6/2015 | ............ B60R 21/18 |

\* cited by examiner

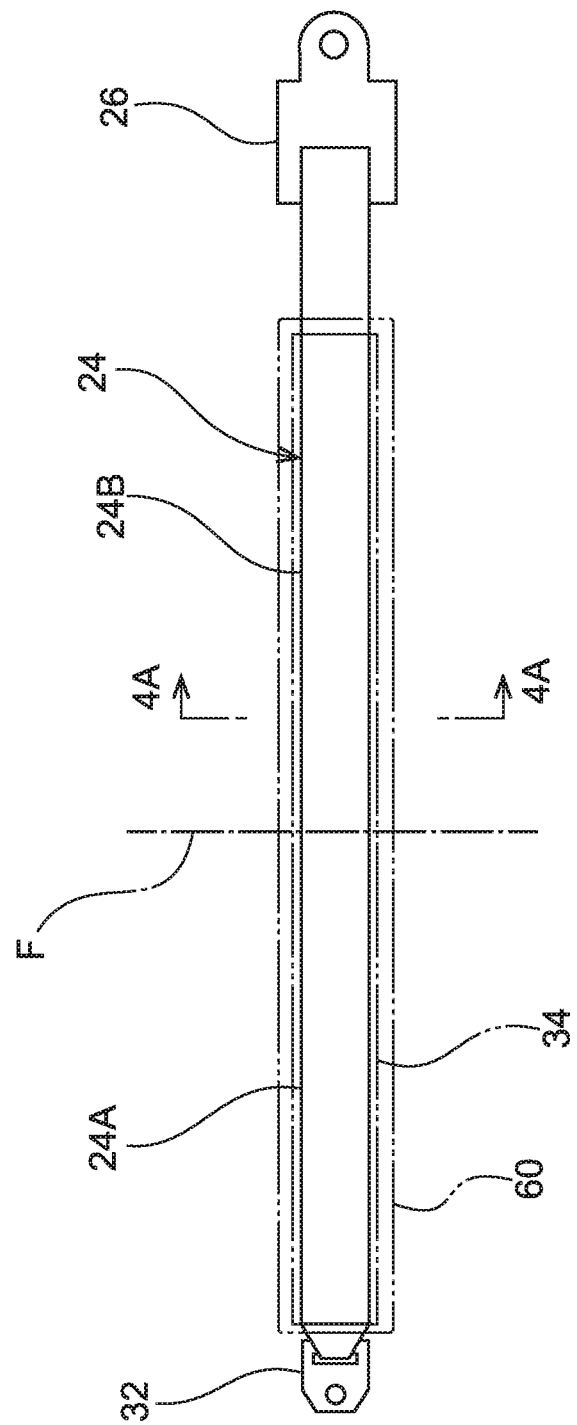

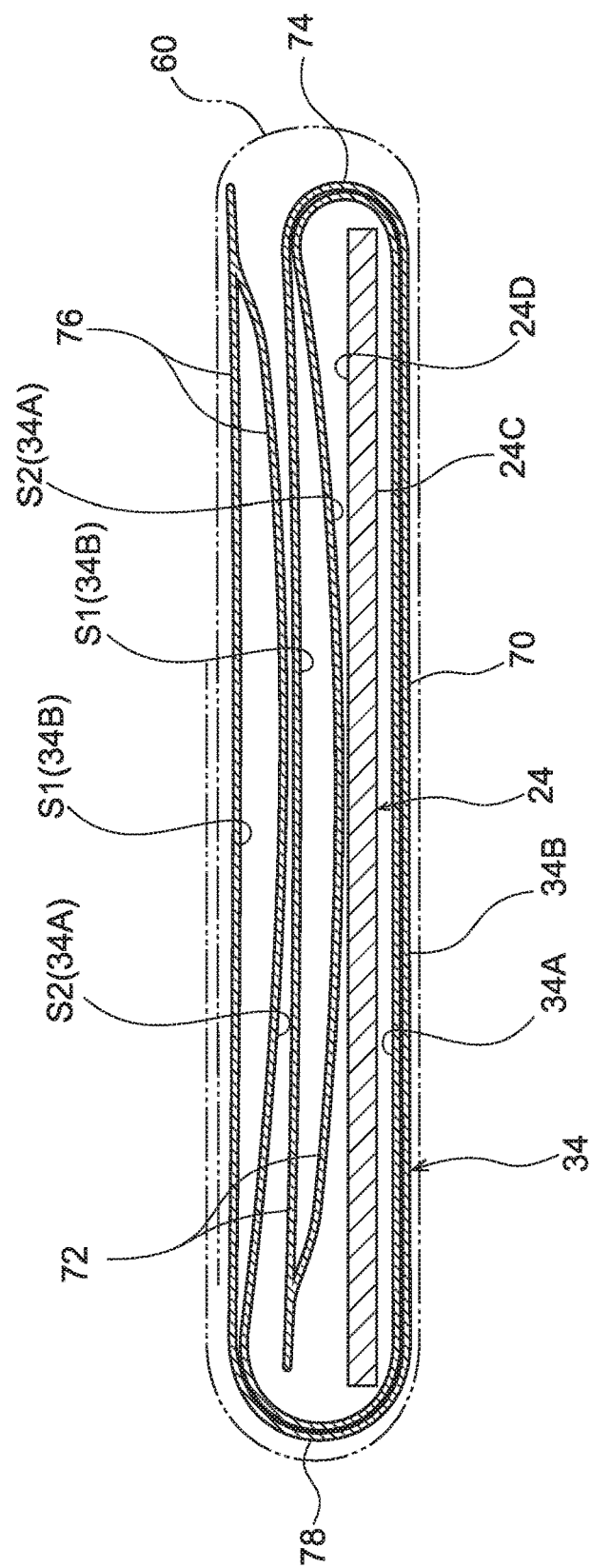

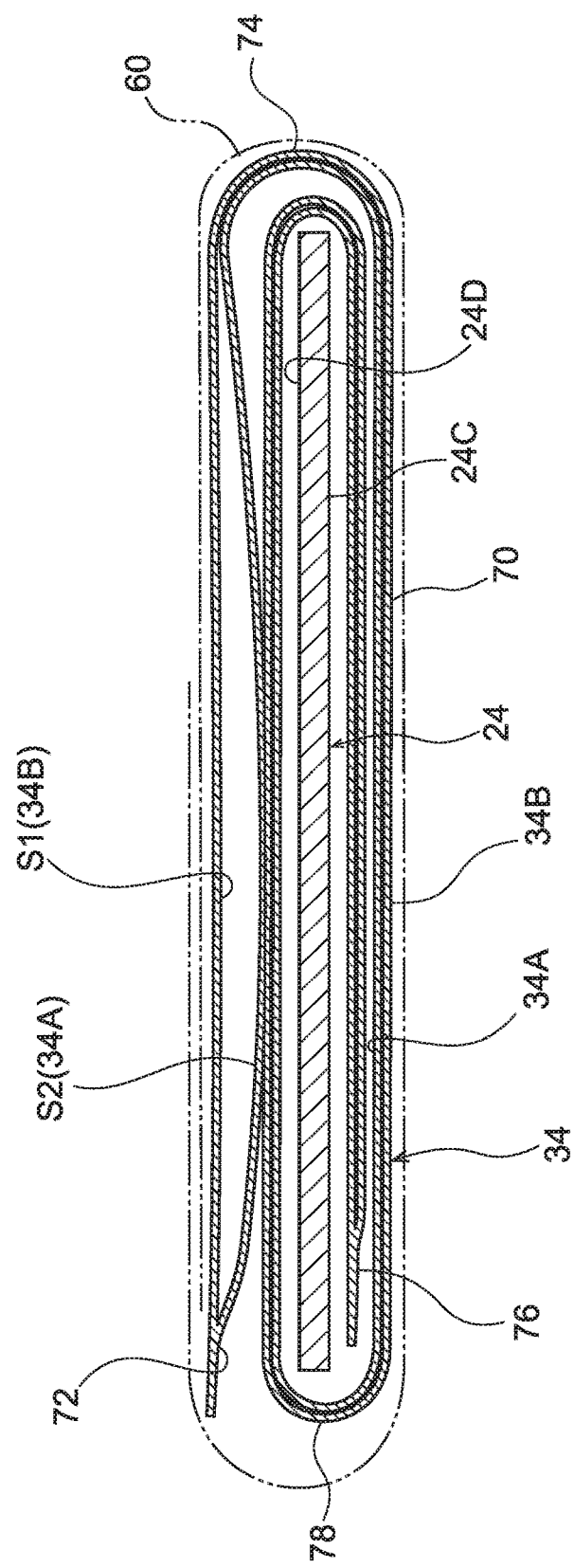

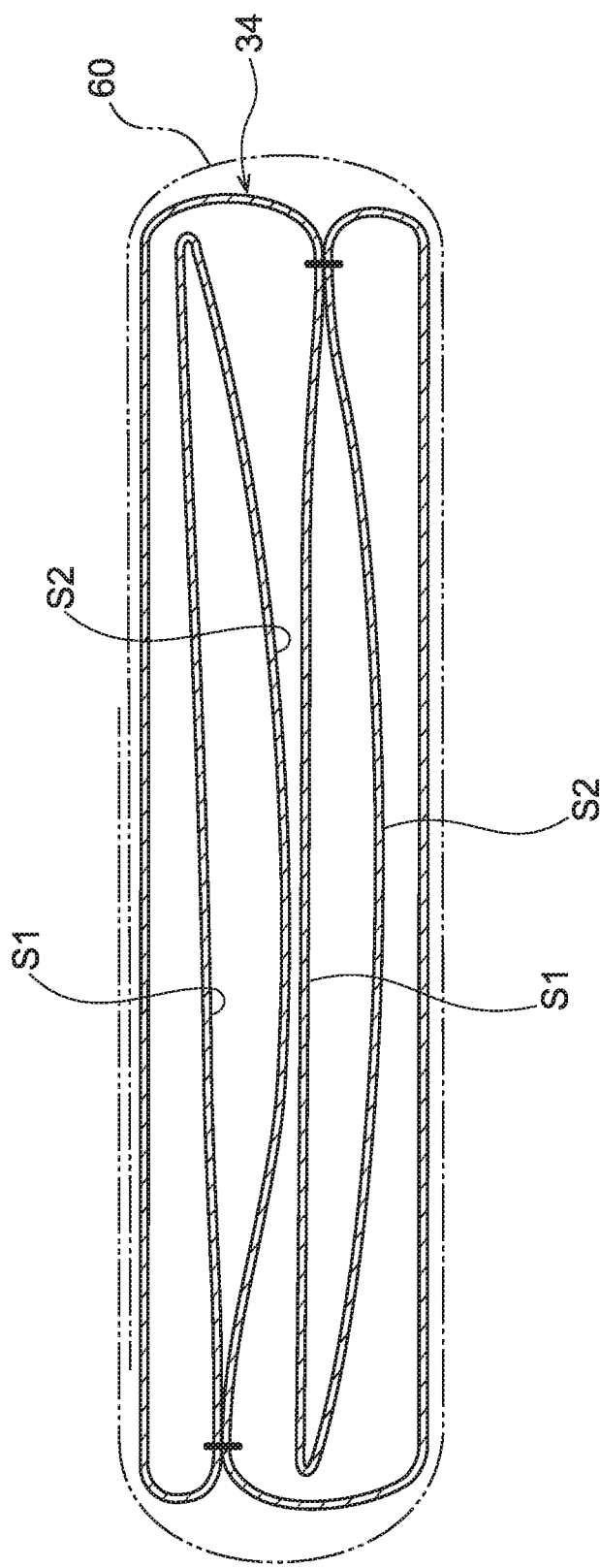

AIR BELT DEVICE

CROSS-REFERENCE TO RELATED APPLICATIONS

The present application is a U.S. National Phase of PCT/JP2015/067069 filed on Jun. 12, 2015 claiming priority to Japanese Patent application No. 2014-136118 filed Jul. 1, 2014. The disclosure of the PCT Application is hereby incorporated by reference into the present Application.

TECHNICAL FIELD

The present invention relates to an air belt device.

BACKGROUND ART

An air belt device (i.e., a seat belt device) that is worn by a vehicle occupant and is provided with webbing that inflates and deploys in a vehicle emergency is disclosed in Japanese National Phase Publication No. 2002-502918. Moreover, a seat belt device that is provided with a conventional type of webbing that does not inflate and deploy in the aforementioned manner is disclosed in Japanese Patent Application Laid-Open (JP-A) No. 2014-19294.

The webbing that forms part of the air belt device described in Japanese National Phase Publication No. 2002-502918 is formed in a bag shape by having an upper-side web layer and a lower-side web layer. During a vehicle emergency, the webbing is inflated and deployed as a result of gas being supplied to a portion between the upper-side web layer and the lower-side web layer. As a consequence, the chest portion of a vehicle occupant can be supported over a broader surface area.

Because the webbing of the air belt device described in Japanese National Phase Publication No. 2002-502918 is formed in a bag shape, it may be thought that the texture (i.e., the sensation) that is felt when touching this webbing is different from the texture felt when touching a conventional type of webbing. Specifically, as an example, if a vehicle occupant grasps the webbing forming part of an air belt device, the shape of the webbing is deformed into a circular cross-section, while if a vehicle occupant grasps a conventional type of webbing, the shape of the webbing is deformed into a U-shaped cross-section.

SUMMARY OF THE INVENTION

Technical Problem

The present invention was conceived in view of the above-described circumstances, and it is an object thereof to provide an air belt device that makes it possible to prevent the texture that a vehicle occupant feels when they touch the webbing of this air belt device from being different from when they touch a conventional type of webbing.

Solution to the Problem

An air belt device according to a first aspect of the present invention is provided with a webbing that is fitted around a vehicle occupant who is sitting in a vehicle seat, an airbag portion that is provided in parallel with the webbing or is formed integrally with the webbing and that is inflated and deployed when gas is supplied to an interior of the airbag portion, a reference portion that forms a portion of the airbag portion and is formed as a result of the airbag portion being folded, and a slack portion that forms another portion of the airbag portion, that is formed as a result of the airbag portion being folded, that extends in parallel with the reference portion, and that has a dimension in the webbing transverse direction, which is longer than a dimension in the webbing transverse direction of the reference portion.

According to the air belt device according to the first aspect of the present invention, when a vehicle occupant who is sitting in a vehicle seat grasps the webbing when fastening or releasing the webbing, the shape of the webbing is deformed. Here, in this air belt device, the dimension in the webbing transverse direction of the slack portion of a folded airbag portion is set longer than the dimension in the webbing transverse direction of the reference portion. Namely, the slack portion of the airbag portion is slacker than the reference portion. As a consequence, when a vehicle occupant grasps the portion of the webbing where the airbag portion is provided, an intermediate portion in the webbing transverse direction of the reference portion is easy to bend in a protruding shape towards the slack portion side. Namely, it is possible to make the portion of the webbing where the airbag portion is provided easy to bend into a U-shape in the same way as a conventional type of webbing. As a result, it is possible to suppress the texture that a vehicle occupant feels when they touch the webbing of the present air belt device from being different from when they touch a conventional type of webbing.

An air belt device according to a second aspect of the present invention is characterized in that, in the air belt device according to the first aspect, the airbag portion is provided in parallel with the webbing and an intermediate portion in the webbing transverse direction of the airbag portion is disposed in parallel with a surface on one side of the webbing, and an end portion on one side in the webbing transverse direction of the airbag portion is disposed in parallel with a surface on another side of the webbing, and an end portion on another side in the webbing transverse direction of the airbag portion is disposed adjacently in the webbing thickness direction to the end portion on the one side in the webbing transverse direction of the airbag portion, and the reference portion and the slack portion which is disposed on the webbing side of the reference portion are provided respectively at the end portion on the one side in the webbing transverse direction of the airbag portion and at the end portion on the other side in the webbing transverse direction of the airbag portion.

According to the air belt device according to the second aspect of the present invention, it is possible to prevent the texture of a type of air belt device in which the airbag portion is provided in parallel with the webbing and in which the airbag portion is folded so as to cover both the surface on one side and the surface on the other side of the webbing from feeling different from a conventional type of webbing.

An air belt device according to a third aspect of the present invention is characterized in that, in the air belt device according to the second aspect, the end on the other side in the webbing transverse direction of the airbag portion is disposed closer to the side of the folded portion between the intermediate portion in the webbing transverse direction of the airbag portion and the end portion on the other side in the webbing transverse direction of the airbag portion, than to the folded portion between the intermediate portion in the webbing transverse direction of the airbag portion and the end portion on the one side in the webbing transverse direction of the airbag portion.

According to the air belt device according to the third aspect of the present invention, when a vehicle occupant grasps the portion of the webbing where the airbag portion is provided, then the end portion on one side in the webbing transverse direction of the airbag portion comes into contact with the end on the other side in the webbing transverse direction of the airbag portion. As a consequence, the end portion on the other side in the webbing transverse direction of the airbag portion is bent even more easily into a U-shape. As a result, it is possible to prevent the texture that a vehicle occupant feels when they touch the webbing of the present air belt device from feeling different from when they touch a conventional type of webbing.

An air belt device according to a fourth aspect of the present invention is characterized in that, in the air belt device according to the second or third aspects, the airbag portion is formed so as to have a first belt-shaped portion that extends in parallel with the webbing, and a second belt-shaped portion that extends in parallel with the first belt-shaped portion and whose two end portions in the webbing transverse direction are formed integrally with two end portions in the webbing transverse direction of the first belt-shaped portion, and island portions that join together an intermediate portion in the webbing transverse direction of the first belt-shaped portion and an intermediate portion in the webbing transverse direction of the second belt-shaped portion are provided in the airbag portion.

According to the air belt device according to the fourth aspect of the present invention, when the first belt-shaped portion and the second belt-shaped portion have been tightly adhered together in the intermediate portion in the webbing transverse direction of the airbag portion, then the airbag portion can be easily folded over (i.e., folded up). As a consequence, the reference portion and the slack portion of the above-described structure can be formed in a stable state in both end portions in the webbing transverse direction of the airbag portion.

An air belt device according to a fifth aspect of the present invention is characterized in that, in the air belt device according to the fourth aspect, a portion of the island portions is provided in the folded portion between the intermediate portion in the webbing transverse direction of the airbag portion and the end portion on the one side in the webbing transverse direction of the airbag portion, and is provided in the folded portion between the intermediate portion in the webbing transverse direction of the airbag portion and the end portion on the other side in the webbing transverse direction of the airbag portion.

According to the air belt device according to the fifth aspect of the present invention, by employing a structure in which a portion of the island portions is provided in the folded portions, the aforementioned portions of the airbag portion can be folded in a stable state. As a consequence, the reference portion and the slack portion of the above-described structure can be formed in a stable state in both end portions in the webbing transverse direction of the airbag portion.

An air belt device according to a sixth aspect of the present invention is characterized in that, in the air belt device according to the fifth aspect, the shape of the folded portions is maintained as a result of sewing being performed in a portion of the island portions.

According to the air belt device according to the sixth aspect of the present invention, it is possible to perform sewing so as to maintain the shape of the folded portions without having to form the holes that result from the sewing in the portions of the airbag portion that are inflated.

Advantageous Effects of the Invention

The air belt device according to the present invention has the excellent effect that it is possible to prevent the texture that a vehicle occupant feels when they touch the webbing of this air belt device from feeling different from when they touch a conventional type of webbing.

BRIEF DESCRIPTION OF THE DRAWINGS

FIG. 2 is a plan view showing an air belt device according to the first exemplary embodiment as a stand-alone body.

FIG. 4A is an enlarged cross-sectional view showing an enlargement of a cross-section of an air belt device taken along a line 4A-4A shown in FIG. 2.

FIG. 9 is an enlarged cross-sectional view corresponding to FIG. 4A showing a cross-section of an air belt device according to a fourth exemplary embodiment.

FIG. 11 is an enlarged cross-sectional view corresponding to FIG. 4A showing a cross-section of an air belt device according to a sixth exemplary embodiment.

Figure 1:
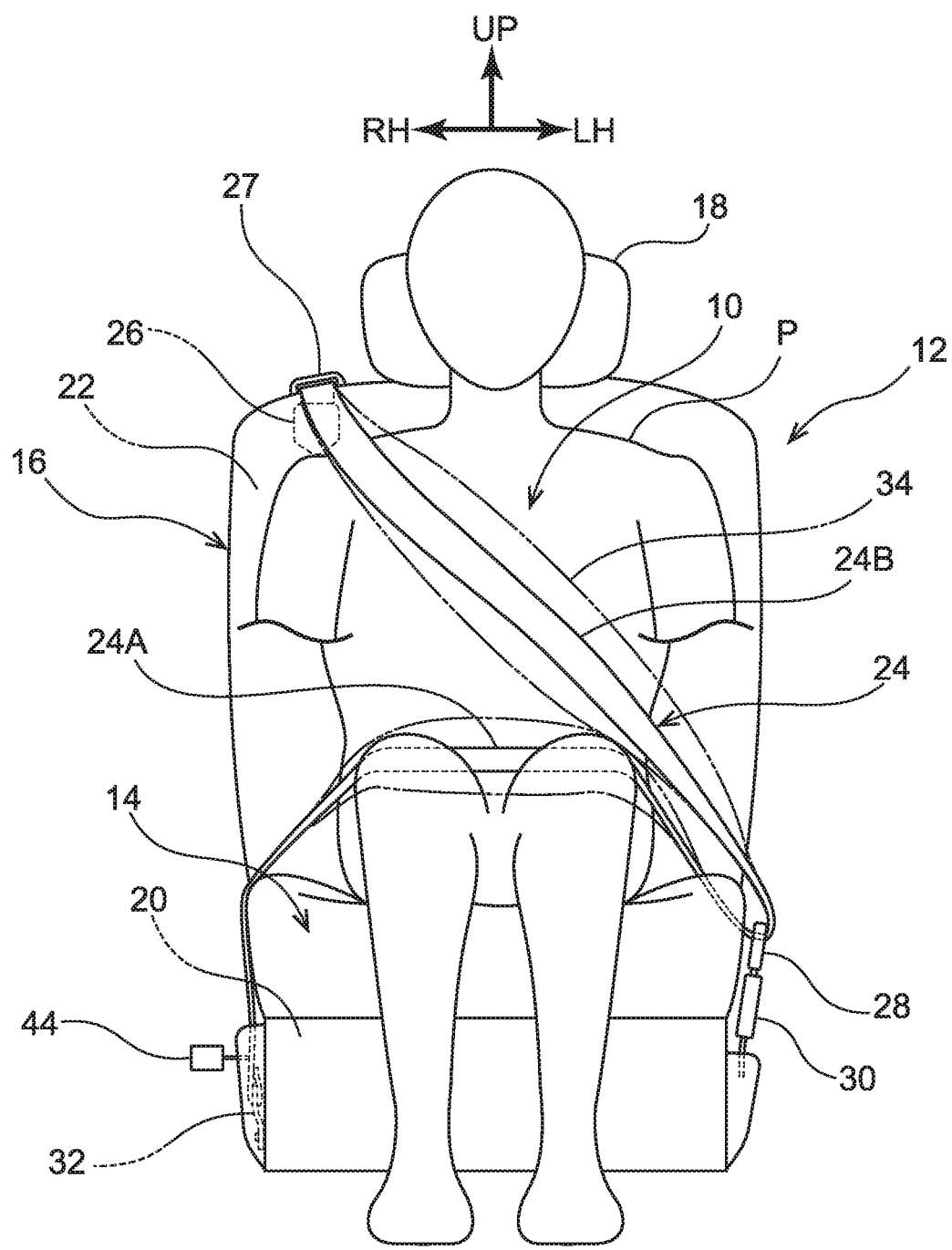
FIG. 1 is a front view as seen from a seat front side showing a vehicle seat and an air belt device according to a first exemplary embodiment.

DESCRIPTION OF THE EMBODIMENTS (Air Belt Device According to a First Exemplary Embodiment)

An air belt device according to a first exemplary embodiment of the present invention will now be described using FIG. 1 through FIG. 4A. Note that when front-rear, left-right, and up-down directions are mentioned in the following description, they refer respectively to front-rear, left-right, and up-down directions as seen by a vehicle occupant who is sitting in a vehicle seat. In addition, arrows UP, RH, and LH that are shown where appropriate in the drawings refer respectively to an upward direction, a right-hand side direction, and a left-hand side direction.

As is shown in FIG. 1, an air belt device 10 according to the present exemplary embodiment is provided in a separate seat 12 (hereinafter, referred to simply as a 'seat 12') that serves as a vehicle seat provided in a second row of what is known as a minivan type of vehicle. Hereinafter, firstly, the schematic structure of the seat 12 will be described, and then the structure of the air belt device 10, which is a principal element of the present exemplary embodiment, will be described.

(Schematic Structure of the Seat 12)

The seat 12 is provided with a seat cushion 14 that supports the buttock portion and the thigh portion of a vehicle occupant P, a seat back 16 that supports the back portion of the vehicle occupant P and is attached to a rear end portion of the seat cushion 14 such that it is able to be tilted, and a headrest 18 that supports the head portion of the vehicle occupant P and is attached to an upper end portion of the seat back 16.

The seat cushion 14 is formed as a result of a seat cushion pad, which has been covered with an upholstery material, being attached to a seat cushion frame 20, and an upper rail (not shown in the drawings) is attached to a lower end portion of the seat cushion frame 20. The seat 12 can be made to slide in the vehicle front-rear direction as a result of this upper rail moving along a lower rail that is provided on the floor of the vehicle body. Moreover, a buckle 30 that holds a tongue 28 is fixed to a left side of the seat cushion frame 20, and an anchor 32 that supports an end portion of a webbing 24 is fixed to a right-side of the seat cushion frame 20.

The seat back 16 is formed as a result of a seat back pad, which has been covered with an upholstery material, being attached to a seat back frame 22, and a retractor device 26 onto which the webbing 24 is wound, and a shoulder anchor 27 through which the webbing 24 is inserted are fixed to the upper end portion at the right-side end portion of the seat back frame 22.

(Structure of the Air Belt Device 10)

As is shown in FIG. 1 and FIG. 2, the air belt device 10 is provided with the webbing 24, the retractor device 26 onto which the webbing 24 is wound, the tongue 28, which has a through hole through which the webbing 24 is inserted, and the buckle 30 that supports the tongue 28, and the anchor 32 that supports an end portion of the webbing 24. Moreover, the air belt device 10 is provided with an airbag 34 serving as an airbag portion that is disposed in parallel with the webbing 24, and a cover component 60 that covers the airbag 34.

As is shown in FIG. 2, the webbing 24 is formed in an elongated belt shape, and the anchor 32 is fixed to an end portion on one side of this webbing 24. An end portion on another side of this webbing 24 is fixed to a spool (not shown in the drawings) of the retractor device 26, and the webbing 24 is housed inside (i.e., wound onto) the retractor device 26 as a result of the rotation of this spool. Moreover, in the present exemplary embodiment, the portion of the webbing 24 where the airbag 34 and the cover component 60 are fixed is unable to be wound onto the spool.

As is shown in FIG. 1, the webbing 24 is unwound from the retractor 26, and as a result of the tongue 28 through which the webbing 24 is inserted being supported by the buckle 30, the webbing 24 is suspended between the left-side and the right-side of the seat 12. As a consequence, the webbing 24 is fitted onto the body of the vehicle occupant P who is sitting in the seat 12. Moreover, during a vehicle emergency (for example, in the event of a collision), the retractor device 26 locks the unwinding of the webbing 24 from the spool. Note that the body type of the vehicle occupant P who is sitting in the seat 12 is the same body type as an AM50 dummy, and the vehicle occupant P is seated in a standard sitting posture in the seat 12 that has been set to a standard usage state.

When the webbing 24 is fitted onto the vehicle occupant P who is sitting in the seat 12, the webbing 24 is folded back at the portion where it is inserted through the tongue 28. A portion of the webbing 24 between the tongue 28 and the anchor 32 forms a lap webbing 24A (i.e., a lap belt) that supports the pelvic portion of the vehicle occupant P, while a portion of the webbing 24 between the shoulder anchor 27 and the tongue 28 forms a shoulder webbing 24B (i.e., a shoulder belt) that supports a portion extending from the pelvic portion to the shoulders of the vehicle occupant P.

Figure 3A:
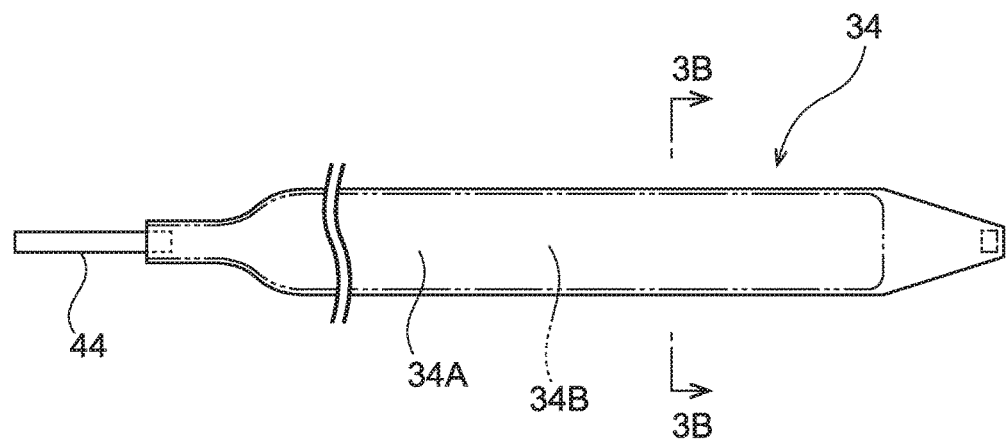
FIG. 3A is a plan view showing an airbag before it is folded.
Figure 3B:
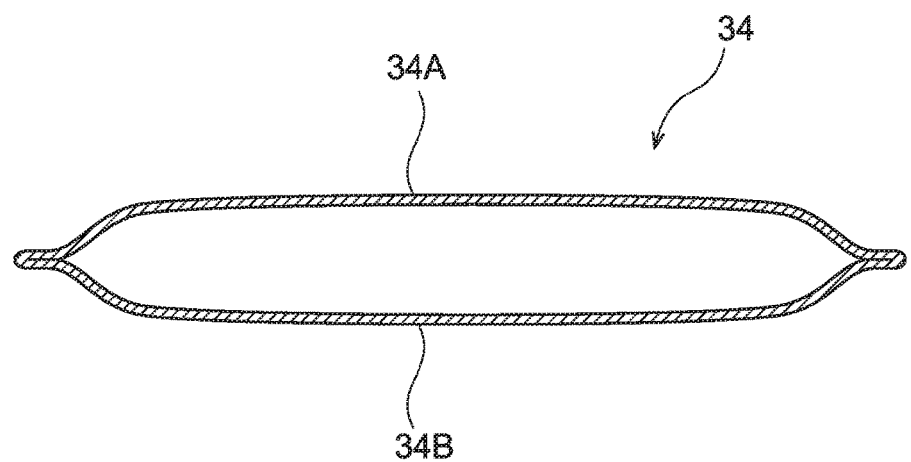
FIG. 3B is an enlarged cross-sectional view showing an enlargement of a cross-section of an airbag taken along a line 3B-3B shown in FIG. 3A.

As is shown in FIG. 3A and FIG. 3B, the airbag 34 is formed in a rectangular shape whose longitudinal direction is the same direction as the longitudinal direction of the webbing 24 (see FIG. 2). Moreover, the airbag 34 is made into a double layer by having a first belt-shaped portion 34A and a second belt-shaped portion 34B that are disposed so as to face in the thickness direction of the webbing 24, and whose end portions in the transverse direction of the webbing 24 are bonded to each other. As a consequence, the airbag 34 is inflated when gas is supplied to the interior of the airbag 34.

As is shown in FIG. 2, FIG. 3A, and FIG. 3B, the dimensions in the longitudinal direction of the airbag 34 correspond to the lengths of the lap webbing 24A which supports the pelvic portion of the vehicle occupant P who is sitting in the seat 12, and the shoulder webbing 24B which supports the portion extending from the pelvic portion to the shoulders of the vehicle occupant P. Moreover, the dimensions in the transverse direction of the airbag 34 when this has been inflated and deployed are wider than the width of the webbing 24. Note that a line F shown in the drawings shows the position where the webbing 24 and the airbag 34 that is attached to this webbing 24 are folded back by the tongue 28 when the webbing 24 is being worn by the vehicle occupant P.

As is shown in FIG. 2, the cover component 60 is formed in a cylindrical shape using a belt-shaped portion that is thinner than the thickness of the webbing 24, and the airbag 34 that is disposed in parallel with the webbing 24 is covered by this cover component 60.

Next, a method of folding the airbag 34, which is a principal element of the present exemplary embodiment, will be described. Note that, in the following description, when a 'transverse direction' is referred to with no further explanation, then this direction refers to the transverse direction of the webbing 24.

A cross-section of the airbag 34 and the webbing 24 as seen from the longitudinal direction of the webbing 24 is shown in FIG. 4A. As is shown in this drawing, the airbag 34 is folded in what is known as a triple-fold by folding over both end portions in the transverse direction.

Specifically, an intermediate portion 70 in the transverse direction of the airbag 34 (hereinafter, this will be referred to simply as the 'intermediate portion 70 of the airbag 34') is disposed in parallel with a surface 24C on one side of the webbing 24. The first belt-shaped portion 34A and the second belt-shaped portion 34B are tightly adhered together in the intermediate portion 70 of the airbag 34.

An end portion 72 on one side in the transverse direction of the airbag 34 (hereinafter, this will be referred to simply as the 'end portion 72 on the one side of the airbag 34') is placed in parallel with a surface 24D on another side of the webbing 24 by folding over a boundary portion between the intermediate portion 70 and the end portion 72 on the one side of the airbag 34. Moreover, this boundary portion between the intermediate portion 70 and the end portion 72 on the one side of the airbag 34 is formed into a folded portion 74 that is folded by performing heating and press-working processing thereon (as an example, by performing ironing processing), and the first belt-shaped portion 34A and the second belt-shaped portion 34B are tightly adhered together in this folded portion 74. Note that, in FIG. 4A, the radius of curvature of the folded portion 74 is represented as being greater than it is in actuality. Furthermore, at the end portion 72 on the one side of the airbag 34, the first belt-shaped portion 34A that is disposed on the webbing 24 side of the second belt-shaped portion 34B is slacker than the second belt-shaped portion 34B. Namely, the dimension in the transverse direction of the first belt-shaped portion 34A is longer than the dimension in the transverse direction of the second belt-shaped portion 34B. Note that the second belt-shaped portion 34B at the end portion 72 on the one side of the airbag 34 is referred to as a reference portion S1, while the first belt-shaped portion 34A at the end portion 72 on the one side of the airbag 34 is referred to as a slack portion S2 which is slacker than the reference portion S1.

An end portion 76 on another side in the transverse direction of the airbag 34 (hereinafter, this will be referred to simply as the 'end portion 76 on the other side of the airbag 34') is placed adjacently in the thickness direction of the webbing 24 to the end portion 72 on the one side of the airbag 34 by folding over a boundary portion between the intermediate portion 70 and the end portion 76 on the other side of the airbag 34. Moreover, this boundary portion between the intermediate portion 70 and the end portion 76 on the other side of the airbag 34 is formed into a folded portion 78 that is folded by performing the aforementioned heating and press-working processing thereon, and the first belt-shaped portion 34A and the second belt-shaped portion 34B are tightly adhered together in this folded portion 78. Note that, in FIG. 4A, in the same way as in the above-described folded portion 74, the radius of curvature of the folded portion 78 is represented as being greater than it is in actuality. Furthermore, at the end portion 76 on the other side of the airbag 34, the first belt-shaped portion 34A that is disposed on the webbing 24 side of the second belt-shaped portion 34B is slacker than the second belt-shaped portion 34B. Namely, the dimension in the transverse direction of the first belt-shaped portion 34A is longer than the dimension in the transverse direction of the second belt-shaped portion 34B. Note that, in the same way as for the end portion 72 on the one side of the airbag 34, the second belt-shaped portion 34B at the end portion 76 on the other side of the airbag 34 is referred to as the reference portion S1, while the first belt-shaped portion 34A at the end portion 76 on the other side of the airbag 34 is referred to as the slack portion S2 which is slacker than the reference portion S1.

(Action and Effects of the Present Exemplary Embodiment)

Next, the action and effects of the present exemplary embodiment will be described.

When, as is shown in FIG. 1, the vehicle occupant P is wearing the webbing 24 and, in this state, the vehicle suddenly decelerates (as an example, when the vehicle is in a frontal collision) thereby causing gas to be supplied from an inflator 44 to the airbag 34, then this airbag 34 is inflated. Next, after the airbag 34 has ruptured the cover component 60, this airbag 34 is inflated and deployed between the webbing 24 and the vehicle occupant P. As a consequence, the chest portion of the vehicle occupant P can be supported over a broader surface area.

Figure 4B:
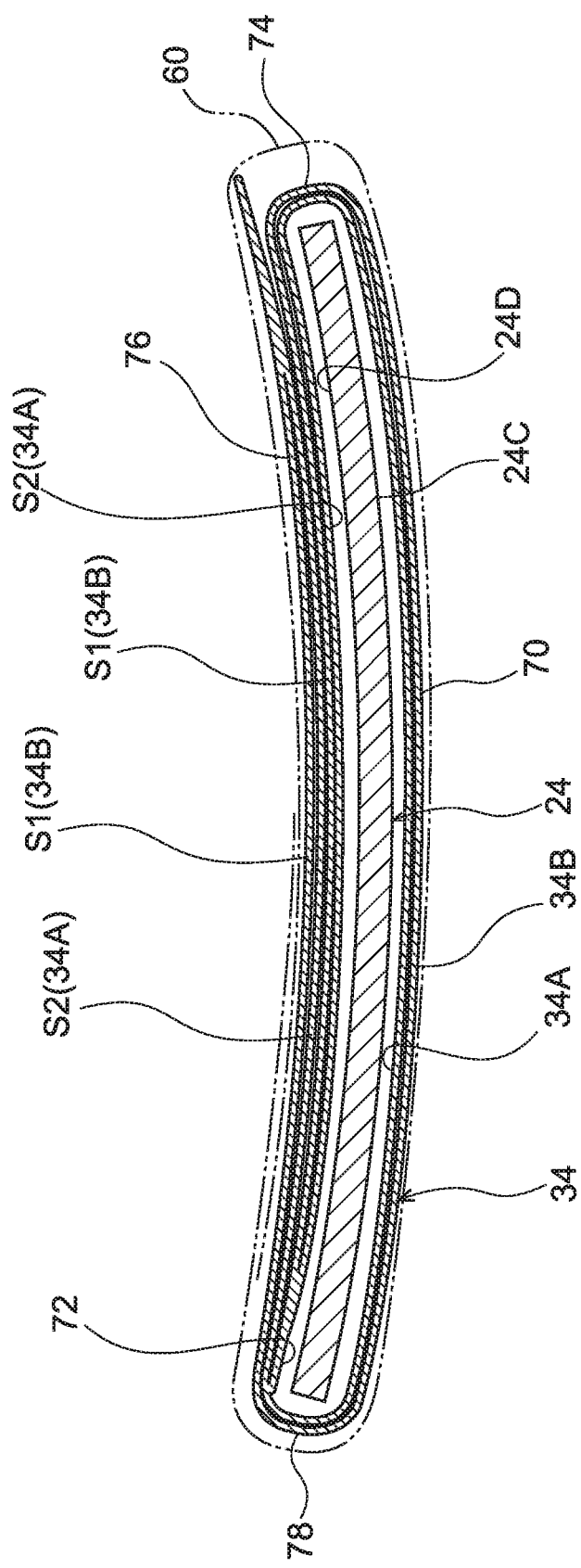
FIG. 4B is an enlarged cross-sectional view corresponding to FIG. 4A schematically showing a cross-section of a particular portion of a webbing where an airbag is provided when this portion is grasped by a vehicle occupant.

When the vehicle occupant P who is sitting in the seat 12 grasps the webbing 24 in order to remove or put on the webbing 24, the webbing 24 is deformed. Here, in the present air belt device 10, as is shown in FIG. 4A, the slack portion S2 (i.e., the first belt-shaped portion 34A) which forms a portion of the end portion 72 on the one side and a portion of the end portion 76 on the other side of the airbag 34 is slacker than (i.e., is not as taut as) the reference portion S1 (i.e., the second belt-shaped portion 34B). As a consequence, when the vehicle occupant P grasps the portion of the webbing 24 where the airbag 34 is provided, then as is shown in FIG. 4B, an intermediate portion in the transverse direction of the reference portion S1 is easily bent so as to protrude towards the slack portion S2 side. Namely, in the same way as in a conventional type of webbing (i.e., a webbing in which an airbag (an airbag portion) is not provided), the portion of the webbing 24 where the airbag 34 is provided can easily be bent into a U-shape. As a result, it is possible to prevent the texture that a vehicle occupant P feels when they touch the webbing of the present air belt device 10 from feeling different from when they touch a conventional type of webbing.

(Air Belt Device According to a Second Exemplary Embodiment)

Next, an air belt device according to a second exemplary embodiment of the present invention will be described using FIG. 5A. Note that components and portion that have the same functions as in the above-described exemplary embodiment are given the same descriptive symbols as in the above-described exemplary embodiment and a description thereof is omitted.

Figure 5A:
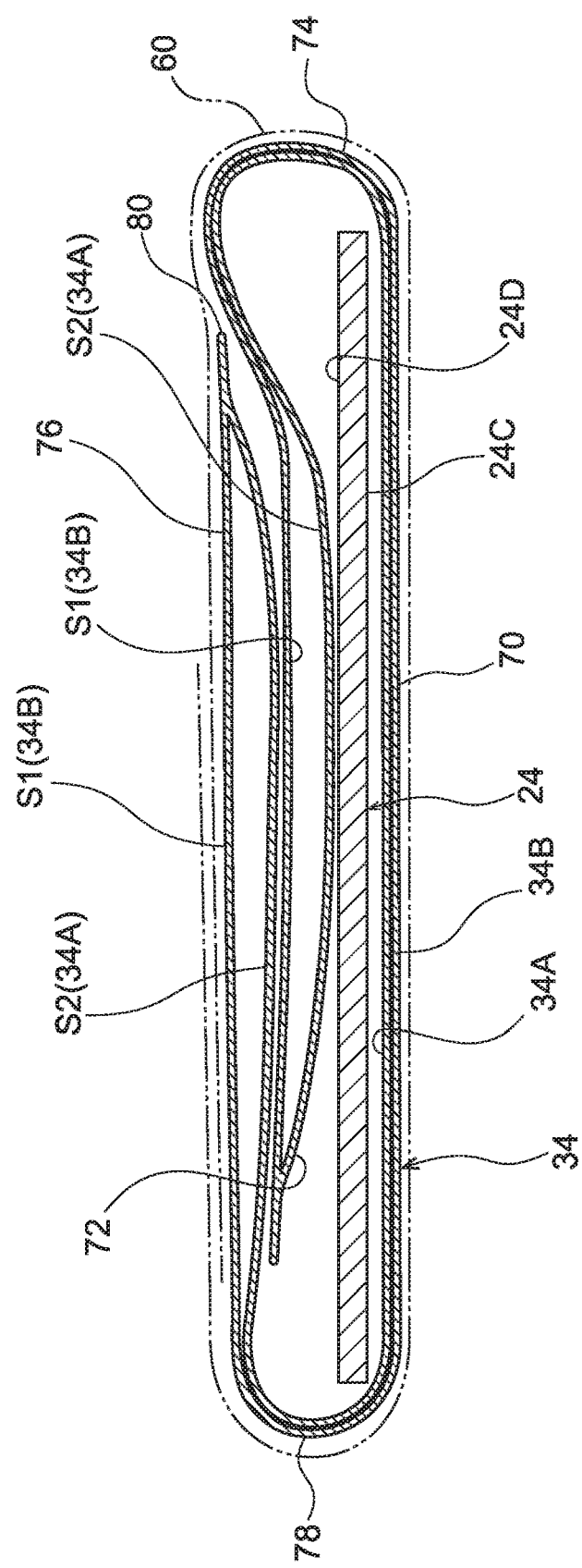
FIG. 5A is an enlarged cross-sectional view corresponding to FIG. 4A showing a cross-section of an air belt device according to a second exemplary embodiment.

As is shown in FIG. 5A, an air belt device according to the present exemplary embodiment is characterized in that an end 80 on another side in the transverse direction of the airbag 34 (hereinafter, this will be referred to simply as the 'end portion 80 on the other side of the airbag 34') is placed closer to the side of the folded portion 78 between the intermediate portion 70 and the end portion 76 on the other side of the airbag 34 than to the folded portion 74 between the intermediate portion 70 and the end portion 72 on the one side of the airbag 34.

Figure 5B:
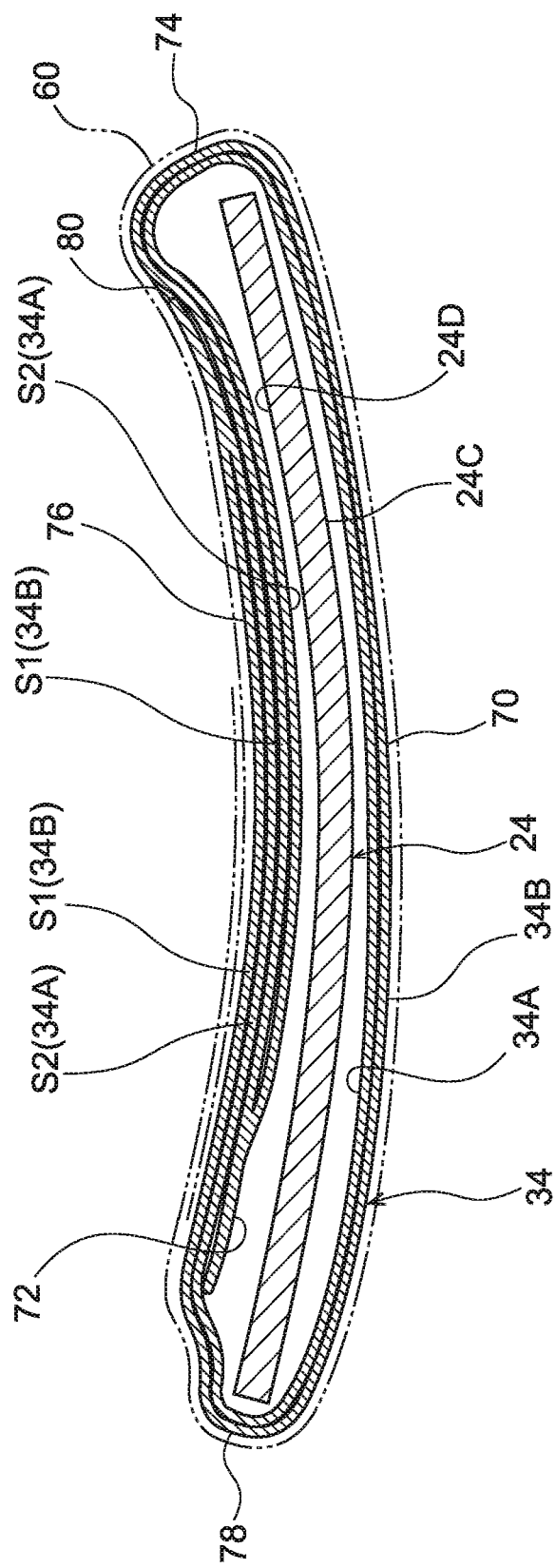
FIG. 5B is an enlarged cross-sectional view corresponding to FIG. 5A schematically showing a cross-section of a particular portion of a webbing where an airbag is provided when this portion is grasped by a vehicle occupant.

In the above-described present exemplary embodiment, when the vehicle occupant P grasps the portion of the webbing 24 where the airbag 34 is provided, then as is shown in FIG. 5B, the end portion 72 on the one side of the airbag 34 comes into contact with the end 80 on the other side of the airbag 34. As a consequence, the end portion 76 on the other side of the airbag 34 is bent even more easily into a U-shape. As a result, it is possible to even more thoroughly prevent the texture that a vehicle occupant P feels when they touch the webbing of the present air belt device from feeling different from when they touch a conventional type of webbing.

(Air Belt Device According to a Third Exemplary Embodiment)

Next, an air belt device according to a third exemplary embodiment of the present invention will be described using FIG. 6 through FIG. 8C. Note that components and portion that have the same functions as in the above-described exemplary embodiments are given the same descriptive symbols as in the above-described exemplary embodiment and a description thereof is omitted.

Figure 6:
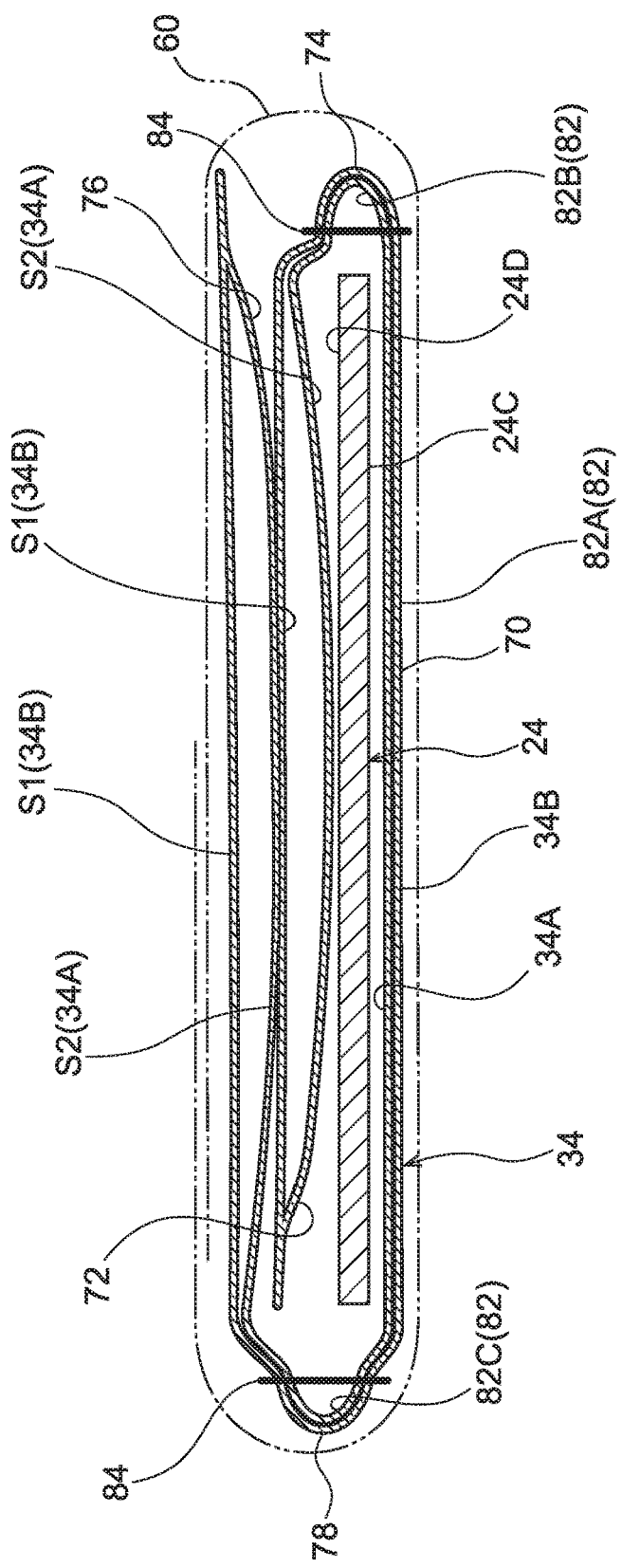
FIG. 6 is an enlarged cross-sectional view corresponding to FIG. 4A showing a cross-section of an air belt device according to a third exemplary embodiment.
Figure 7:
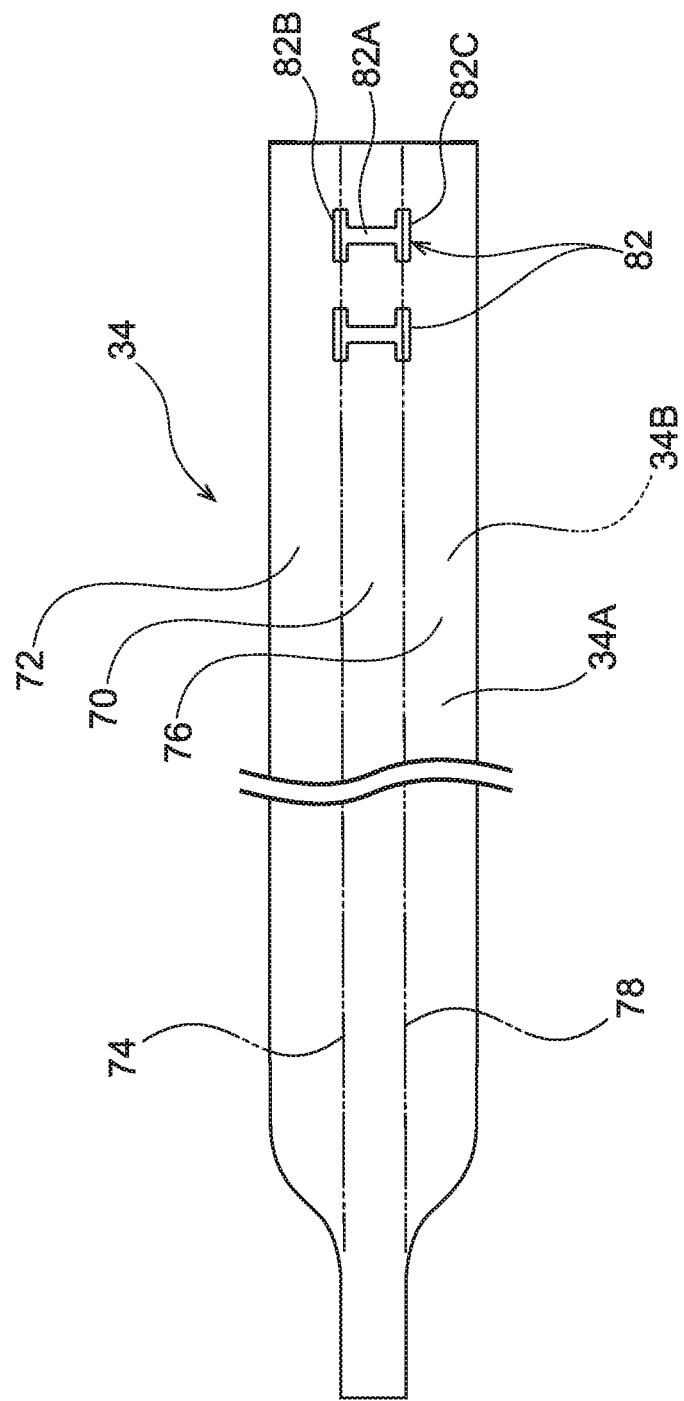
FIG. 7 is a plan view corresponding to FIG. 3A showing an airbag that forms part of the air belt device according to the third exemplary embodiment.

As is shown in FIG. 6 and FIG. 7, the air belt device according to the present exemplary embodiment is characterized in that island portions 82 that join together the first belt-shaped portion 34A and the second belt-shaped portion 34B are provided, and sewing processing is performed in order to maintain the shape of the folded portions 74 and 78.

Figure 8A:
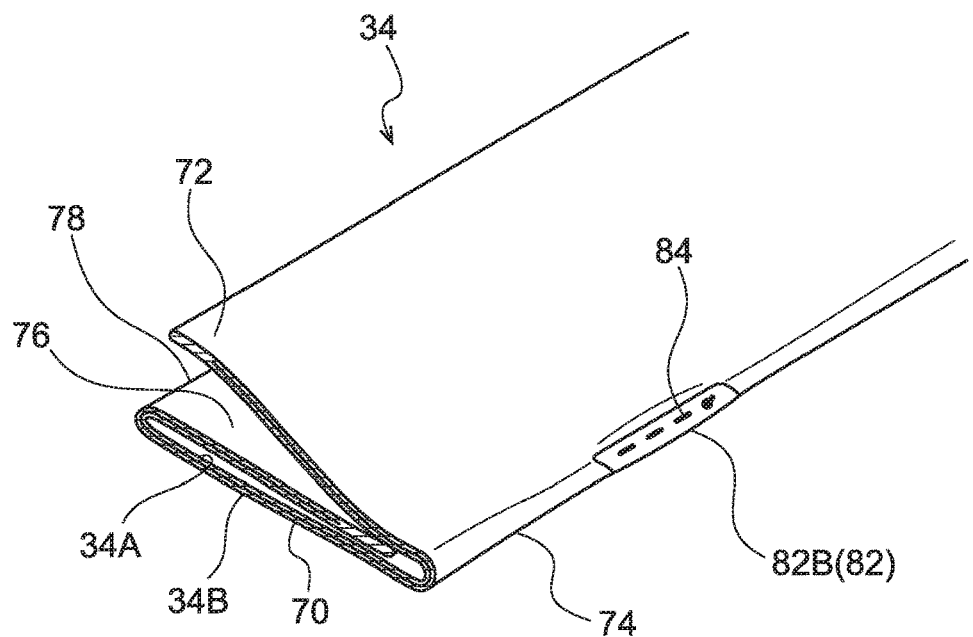
FIG. 8A is an enlarged perspective view as seen from another side in the webbing thickness direction showing a folded airbag.
Figure 8B:
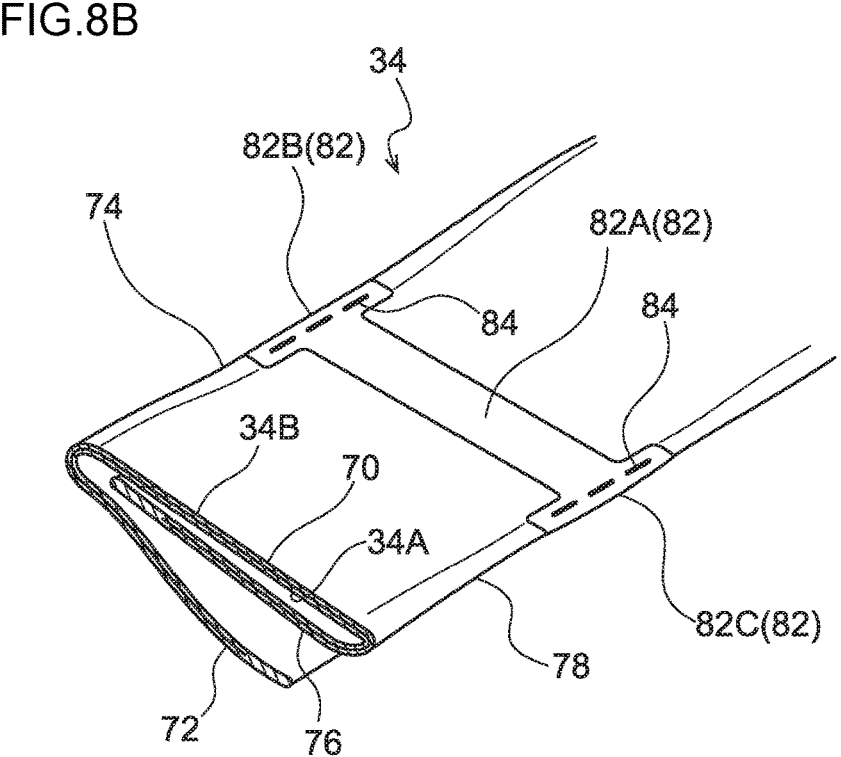
FIG. 8B is an enlarged perspective view as seen from one side in the webbing thickness direction showing a folded airbag.
Figure 8C:
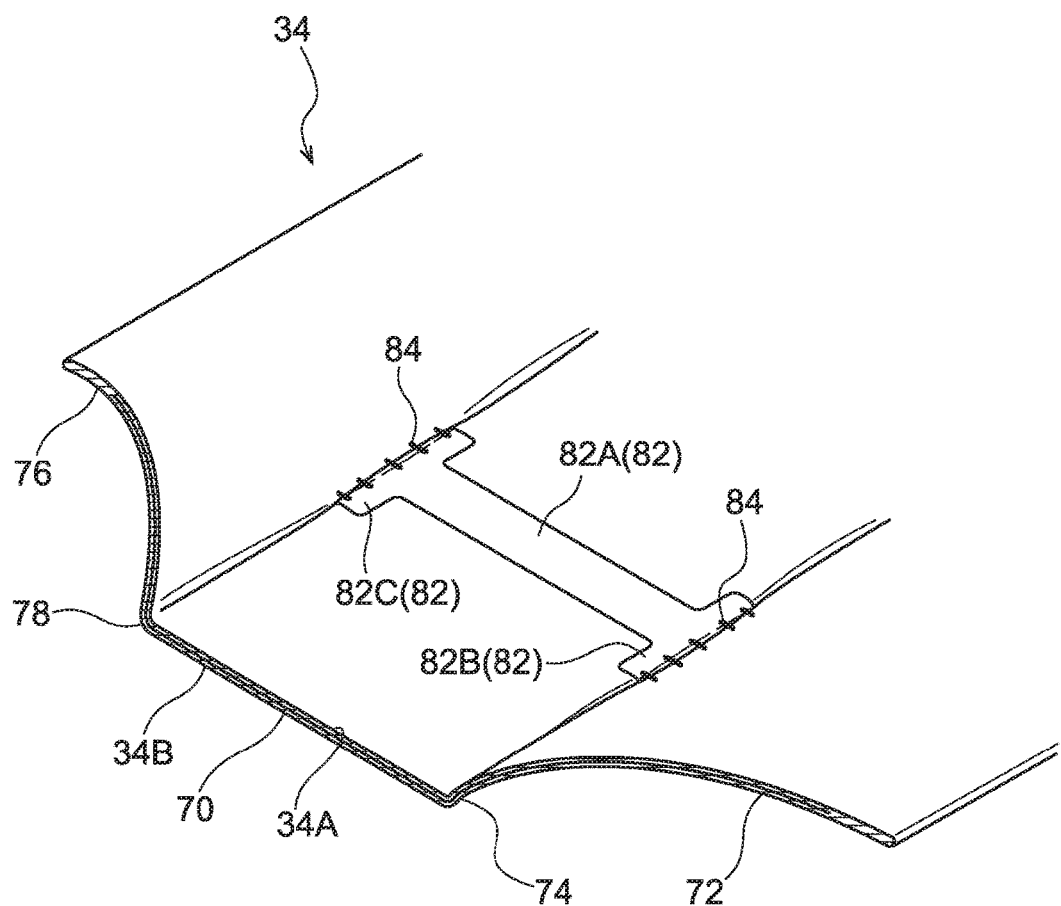
FIG. 8C is an enlarged perspective view showing a sewn portion in a folded portion.

As is shown in FIG. 7, two island portions 82 that are formed in an H-shape (or in an I-shape) when seen in plan view, and that are disposed apart from each other in the longitudinal direction of the webbing 24 are provided in the portion of the airbag 34 that is opposite the chest portion of the vehicle occupant. The island portions 82 are formed as a result of a portion of the first belt-shaped portion 34A and a portion of the second belt-shaped portion 34B being up-woven so as to form a non-sewn portion. As a consequence of this, the portions of the airbag 34 that correspond to the island portions 82 are formed as portions whose dimensions in the thickness direction of the webbing 24 do not change when gas is supplied to the interior of the airbag 34. Moreover, the island portions 82 are formed having an intermediate portion joining portion 82A that joins together an intermediate portion in the transverse direction of the first belt-shaped portion 34A and an intermediate portion in the transverse direction of the second belt-shaped portion 34B, and folded portion joining portions 82B and 82C that join the first belt-shaped portion 34A and the second belt-shaped portion 34B together in those portions of the airbag 34 that correspond to the folded portions 74 and 78. In addition, as is shown in FIG. 8A, FIG. 8B, and FIG. 8C, the shape of the folded portions 74 and 78 is maintained as a result of sewing being carried out in the folded portion joining portions 82B and 82C. Note that, in the present exemplary embodiment, the shape of the folded portions 74 and 78 is maintained as a result of wave-sewn seam portions 84 being formed in the longitudinal direction of the folded portion joining portions 82B and 82C (i.e., in the longitudinal direction of the webbing 24) that are superimposed on each other by being folded over.

In the above-described present exemplary embodiment, when the first belt-shaped portion 34A and the second belt-shaped portion 34B have been tightly adhered together in the intermediate portion 70 of the airbag 34, then the airbag 34 can be easily folded over (i.e., folded up). As a consequence, the reference portion S1 and the slack portion S2 of the above-described structure can be formed in a stable state in the end portion 72 on the one side and the end portion 76 on the other side of the airbag 34.

Moreover, in the present exemplary embodiment, as a result of the folded portion joining portions 82B and 82C being provided in the above-described island portions 82, the portions of the airbag 34 that correspond to the folded portions 74 and 78 can be folded in a stable state. As a consequence, the reference portion S1 and the slack portion S2 of the above-described structure can be formed in a stable state in the end portion 72 on the one side and the end portion 76 on the other side of the airbag 34.

Furthermore, in the present exemplary embodiment, by providing the seam portions 84 in the folded portion joining portions 82B and 82C, which are non-inflating portions of the airbag 34, the shape of the folded portions 74 and 78 can be maintained. In other words, in the present exemplary embodiment, it is possible to maintain the shape of the folded portions 74 and 78 without having to form the holes that would result if sewing were performed in the portions of the airbag 34 that are inflated.

Figure 10:
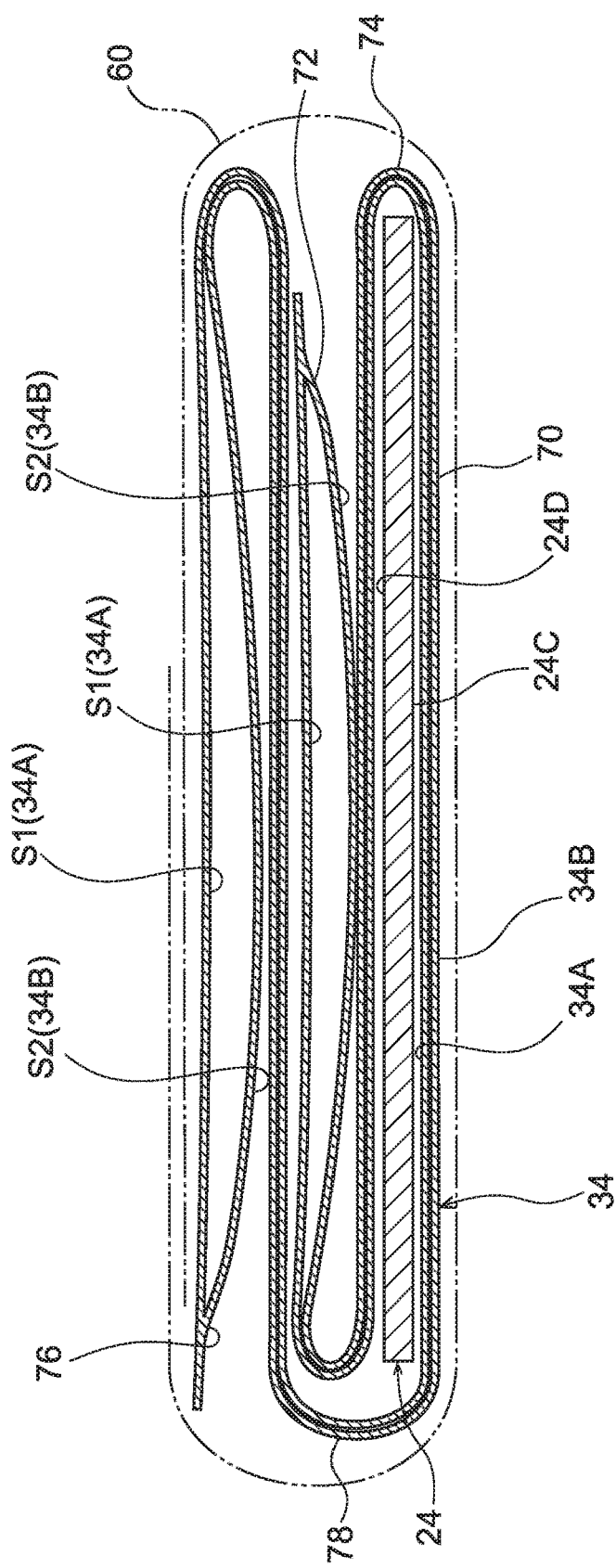
FIG. 10 is an enlarged cross-sectional view corresponding to FIG. 4A showing a cross-section of an air belt device according to a fifth exemplary embodiment.

Note that in the above-described first exemplary embodiment, second exemplary embodiment, and third exemplary embodiment, an example in which the airbag 34 is folded up into a triple-folded state is described, however, the present invention is not limited to this. For example, as in a fourth exemplary embodiment and a fifth exemplary embodiment that are shown in FIG. 9 and FIG. 10, it is also possible to employ a structure in which the airbag 34 is folded up into a four-folded state or a five-folded state. Moreover, by sewing a portion of the airbag 34, the airbag 34 can be folded such that the portions thereof that correspond to the above-described reference portion S1 and slack portion S2 are located inside the airbag 34. In this manner, the method used to fold the airbag 34 can be appropriately set in consideration of the width and the like of the airbag 34.

Moreover, in the present exemplary embodiment, an example in which the airbag 34 is provided in parallel with the webbing 24 is described, however, the present invention is not limited to this. For example, as is shown in FIG. 11, the present invention can also be applied to an air belt device having an airbag portion that is formed integrally with the webbing. In this case as well, by providing the above-described reference portion S1 and slack portion S2, it is possible to prevent the texture that a vehicle occupant P feels when they touch the webbing of the present air belt device from feeling different from when they touch a conventional type of webbing.

Exemplary embodiments of the present invention have been described above, however, it should be understood that the present invention is not limited to these exemplary embodiments and various modifications and the like may be made thereto insofar as they do not depart from the spirit or scope of the present invention.

Priority is claimed on Japanese Patent Application No. 2014-136118, filed Jul. 1, 2014, the disclosure of which is incorporated herein by reference.

The invention claimed is:

1. An air belt device comprising:
a webbing that is fitted around a vehicle occupant who is sitting in a vehicle seat;
an airbag portion that is provided in parallel with the webbing or is formed integrally with the webbing, and that is inflated and deployed when gas is supplied to an interior of the airbag portion;
a reference portion that forms a portion of the airbag portion and is formed as a result of the airbag portion being folded; and
a slack portion that forms another portion of the airbag portion, that is formed as a result of the airbag portion being folded, that extends in parallel with the reference portion, and that has a dimension in the webbing transverse direction, which is longer than a dimension in the webbing transverse direction of the reference portion,
wherein the airbag portion is provided in parallel with the webbing, and an intermediate portion in the webbing transverse direction of the airbag portion is disposed in parallel with a surface on one side of the webbing;
an end portion on one side in the webbing transverse direction of the airbag portion is disposed in parallel with a surface on another side of the webbing;
an end portion on another side in the webbing transverse direction of the airbag portion is disposed adjacently in the webbing thickness direction to the end portion on the one side in the webbing transverse direction of the airbag portion; and
the slack portion is disposed on a side closer to the webbing than the reference portion, and the slack portion and the reference portion are provided respectively at the end portion on the one side in the webbing transverse direction of the airbag portion and at the end portion on the other side in the webbing transverse direction of the airbag portion.

2. The air belt device according to claim 1, wherein the end on the other side in the webbing transverse direction of the airbag portion is disposed closer to the side of a folded portion between the intermediate portion in the webbing transverse direction of the airbag portion and the end portion on the other side in the webbing transverse direction of the airbag portion, than to a folded portion between the intermediate portion in the webbing transverse direction of the airbag portion and the end portion on the one side in the webbing transverse direction of the airbag portion.

3. The air belt device according to claim 1, wherein:

the airbag portion is formed so as to include a first belt-shaped portion that extends in parallel with the webbing, and a second belt-shaped portion that extends in parallel with the first belt-shaped portion and whose two end portions in the webbing transverse direction are formed integrally with two end portions in the webbing transverse direction of the first belt-shaped portion; and island portions that join together an intermediate portion in the webbing transverse direction of the first belt-shaped portion and an intermediate portion in the webbing transverse direction of the second belt-shaped portion are provided in the airbag portion.

4. The air belt device according to claim 3, wherein a portion of the island portions is provided in the folded portion between the intermediate portion in the webbing transverse direction of the airbag portion and the end portion on the one side in the webbing transverse direction of the airbag portion, and is provided in the folded portion between the intermediate portion in the webbing transverse direction of the airbag portion and the end portion on the other side in the webbing transverse direction of the airbag portion.

5. The air belt device according to claim 4, wherein a shape of the folded portions is maintained as a result of sewing being performed in a portion of the island portions.

6. The air belt device according to claim 2, wherein:

the airbag portion is formed so as to include a first belt-shaped portion that extends in parallel with the webbing, and a second belt-shaped portion that extends in parallel with the first belt-shaped portion and whose two end portions in the webbing transverse direction are formed integrally with two end portions in the webbing transverse direction of the first belt-shaped portion; and island portions that join together an intermediate portion in the webbing transverse direction of the first belt-shaped portion and an intermediate portion in the webbing transverse direction of the second belt-shaped portion are provided in the airbag portion.

* * * * *